US009148911B2

(12) United States Patent
Kohn et al.

(10) Patent No.: US 9,148,911 B2

(45) Date of Patent: Sep. 29, 2015

(54) SAFETY CIRCUIT FOR HEATING DEVICE

(75) Inventors: Gabriel S. Kohn, Boca Raton, FL (US); William Levy, Coral Springs, FL (US)

(73) Assignee: Sunbeam Products, Inc., Boca Raton, FL (US)

( * ) Notice: Subject to any disclaimer, the term of this patent is extended or adjusted under 35 U.S.C. 154(b) by 224 days.

(21) Appl. No.: 13/548,691

(22) Filed: Jul. 13, 2012

(65) Prior Publication Data

US 2013/0015174 A1 Jan. 17, 2013

Related U.S. Application Data

(60) Provisional application No. 61/507,645, filed on Jul. 14, 2011.

(51) Int. Cl.

| | |
|---|---|
| ***H05B 1/00*** | (2006.01) |
| ***H05B 3/00*** | (2006.01) |
| ***H05B 11/00*** | (2006.01) |
| ***H02H 1/00*** | (2006.01) |
| ***H05B 1/02*** | (2006.01) |
| ***H05B 3/34*** | (2006.01) |

(52) U.S. Cl.

CPC .............. *H05B 1/0272* (2013.01); *H05B 3/342* (2013.01)

(58) Field of Classification Search

CPC ................. H05B 1/0272; H05B 3/342; H05B 2203/014; H02H 7/224; H01H 71/68

USPC ............ 219/209, 211, 212, 482–507; 361/18, 361/59–61, 86, 88, 103, 114

See application file for complete search history.

(56) References Cited

U.S. PATENT DOCUMENTS

| | | | |
|---|---|---|---|
| 4,436,986 | A | 3/1984 | Carlson |
| 4,485,296 | A | 11/1984 | Ueda et al. |
| 4,554,507 | A | 11/1985 | Brown |
| 5,196,781 | A | 3/1993 | Jamieson et al. |
| 5,223,821 | A | 6/1993 | Poe et al. |
| 5,422,461 | A | 6/1995 | Weiss |
| 5,914,545 | A | 6/1999 | Pollersbeck |
| 6,122,157 | A | 9/2000 | Gerlach |
| 6,606,228 | B1 | 8/2003 | Potter, IV |
| 6,689,989 | B2 | 2/2004 | Irwin, Sr. et al. |
| 7,485,832 | B2 | 2/2009 | Wang |
| 8,143,559 | B2 | 3/2012 | Chow |
| 2005/0109752 | A1 | 5/2005 | Merk et al. |
| 2005/0263518 | A1 | 12/2005 | Weiss |
| 2007/0139844 | A1 | 6/2007 | Horey et al. |
| 2009/0261089 | A1 | 10/2009 | Chang |
| 2011/0259872 | A1 | 10/2011 | Wang et al. |
| 2012/0004788 | A1 | 1/2012 | Keane |

*Primary Examiner* — Dana Ross

*Assistant Examiner* — Lindsey C Teaters

(74) *Attorney, Agent, or Firm* — Seth M. Blum

(57) ABSTRACT

The present disclosure is directed to a safety circuit for use in textile heating devices, such as heating pads, heating blankets, and the like. The safety circuit provides a system for checking/verifying the integrity of the controller, which can shut off power to the textile heating device if the controller has lost integrity.

19 Claims, 3 Drawing Sheets

SAFETY CIRCUIT FOR HEATING DEVICE

CROSS-REFERENCE TO RELATED APPLICATION

The present invention claims priority to U.S. Provisional Application No. 61/507,645 entitled SAFETY CIRCUIT FOR HEATING PAD, filed on Jul. 14, 2011, the contents of which are herein incorporated by reference in its entirety.

FIELD OF THE INVENTION

This invention relates generally to textile heating devices, such as heating pads, heating blankets, and the like, and in particular, to a safety circuit in a controller to disable the controller upon a controller failure.

BACKGROUND OF THE INVENTION

Textile heating devices, such as heating pads, heating blanket and the like, can be used to keep individuals or certain muscles of an individual warm. A heating pad general includes opposing layers of cloth material having a heating element disposed there between. The heating element is connectable to an electrical power source through a controller which controls the amount of heat output from the heating element.

The heating element may, for example, be heated by resistance via electricity, and may be provided as one or more metallic wires threaded throughout the pad. The shape and size of the metallic wires may vary, and in some cases the wires may actually be small metallic threads. The heating element may includes a wire construction which is made of a center conductor which has Positive Temperature Coefficient (PTC) characteristics. Around the center PTC wireis a layer of Negative Temperature Coefficient (NTC) material. An electric heating pad is typically plugged into a power outlet so that power may be supplied to the heating element, causing the production of heat. In this manner, the heating pad may be used to warm a desired area of the body.

SUMMARY OF THE INVENTION

The present disclosure is directed to a safety circuit for use in textile heating devices, such as heating pads, heating blankets, and the like. The safety circuit provides a system for checking/verifying the integrity of the controller, which can shut off power to the textile heating device if the controller has lost integrity.

An exemplary textile heating device includes a heating element connected to a controller, the controller providing power to the heating element. The controller includes a microprocessor electrically connectable to a power source. Output of microprocessor is connected to heating element by a switch circuit. A test circuit is connected between the switch circuit and the microprocessor for testing the integrity of the switch circuit.

A disabling circuit including an electronic disabling switch and a fuse is connected to the microprocessor, the fuse being positioned between the power source and the microprocessor. The electronic disabling switch can be closed to provide a current path to the fuse upon recite of a signal from the microprocessor. The closing of the electronic disabling switch provides a path to the fuse for current to blow the fuse, cutting off power the controller, disabling the controller and cutting power to the heating element.

In operation, once the textile heating device is actuated and a user-desired heat setting is selected, the microprocessor actuates switch circuit such that current flows to heating element so as to cause it to radiate heat. Periodically, the microprocessor activates the test circuit, while simultaneously deactivating the switch circuit. The test circuit tests the integrity of the switch circuit's electronic switches, verifying the switch circuit is operating correctly. If the test circuit shows that the switch circuit is operating correctly, the microprocessor reactivates the switch circuit such that current flows to the heating element so as to cause it to radiate heat.

If the test circuit shows the switch circuit is not operating correctly, for example, the switch circuit has a short, the test circuit provides a signal to the microprocessor. In response, the microprocessor provides a signal to activate the disabling circuit, closing the electronic disabling switch. The disabling circuit provides a path for current to blow the fuse, removing the current to the heating element. In the manner, the controller is disabled, preventing the operation of the textile heating device.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

The present disclosure is directed to a safety circuit for use in textile heating devices, such as heating pads, heating blankets, and the like. The safety circuit provides a system for checking/verifying the integrity of the controller, which can shut off power to the textile heating device if the controller has lost integrity.

Figure 1:
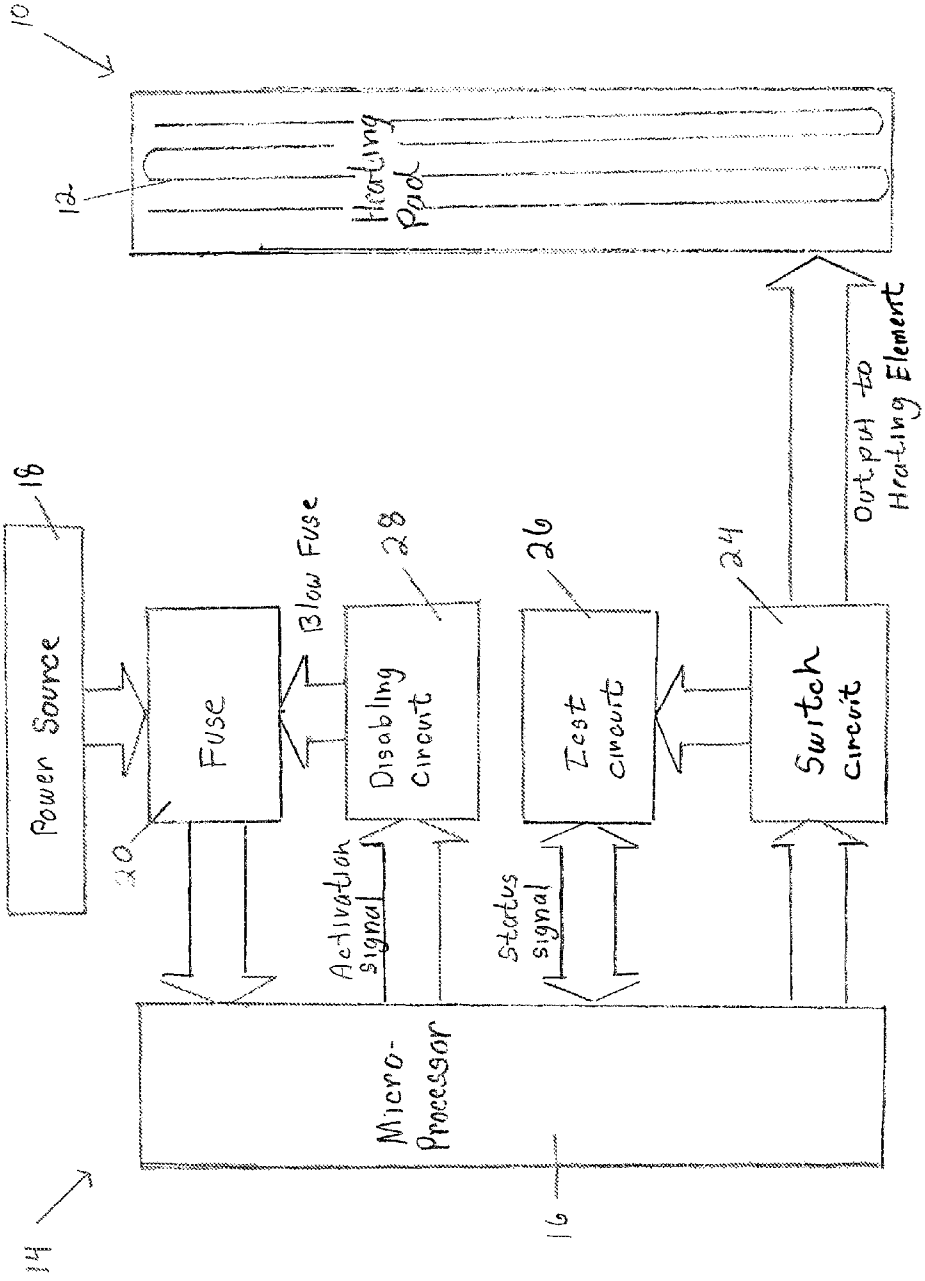
FIG. 1 depicts a schematic view of a heating pad of the present disclosure.

Referring now to the drawing figures in which like reference designators refer to like elements, there is shown in FIG. 1 a schematic view of a textile heating device 10, heating pad, in accordance with the present disclosure. Heating pad 10 includes heating element 12. A controller 14 is operably connected to the heating element 12 in the heating pad 10 to provide power there to.

The controller 14 includes microprocessor 16 electrically connectable to a power source 18 though a fuse 20. Output of microprocessor 16 is operatively connected to heating element 12 of heating pad 10 by a switch circuit 24. A test circuit 26 is connected between the switch circuit 24 and the microprocessor 16 for testing the integrity of the switch circuit 24.

A disabling circuit 28 is operatively connected to the microprocessor 16, and includes the fuse 20 and electronic disabling switch, which can be closed to provide a path for current to the fuse 20. Upon recite of a signal from the microprocessor 16, the electronic switch in the disabling circuit 28 is closed to provide a path for current to blow the fuse 20, disabling the controller 14 and cutting power to the heating element 12 of the heating pad 10.

In operation, the controller 14 is electrically connected to power source 18 through fuse 20, to provide power to heating pad 10. The power source 18 can have a predetermined voltage and frequency, e.g. 120 VAC at 60 Hz, via a standard electrical plug. The controller 14 can include a mode selector for selecting one of a plurality of heat settings for the heating pad 10. By way of example, these heat settings may include "ON/OFF," "WARM," "LOW," "MED" and "HIGH."

Once heating pad 10 is actuated and a user-desired heat setting is selected, microprocessor 16 actuates switch circuit 24 such that current flows to heating element 12 so as to cause it to radiate heat. In an embodiment, the controller 14 can provide power to the heating element 12 such that the heating pad 10 operates at 50 watts. Alternatively, the controller 14 can provide power to the heating element 12 such that the heating pad 10 operates at 100 watts. The increased wattage allowing the heating element 14 to heat up to the selected heat setting in a shorter time period. The above noted operating wattages are exemplary in nature, and it is contemplated that the heating pad 10 can operate at other wattages.

Periodically, the microprocessor 16 activates the test circuit 26, while simultaneously deactivating the switch circuit 24. The test circuit 26 tests the integrity of the switch circuit 24, verifying the switch circuit 24 is operating correctly. If the test circuit 26 shows that the switch circuit 24 is operating correctly, the microprocessor 16 reactivates the switch circuit 24 such that current flows to heating element 12 so as to cause it to radiate heat.

If the test circuit 26 shows the switch circuit 24 is not operating correctly, for example, the switch circuit 24 has a short, the test circuit 26 provides a signal to the microprocessor 16. In response, the microprocessor 16 provides a signal to activate the disabling circuit 28, closing the electronic switch. The disabling circuit 28 provides a path for current to blow the fuse 20, removing the current to the heating element 12. In this manner, the controller 14 is disabled, preventing the operation of the heating pad 10.

Figure 2:
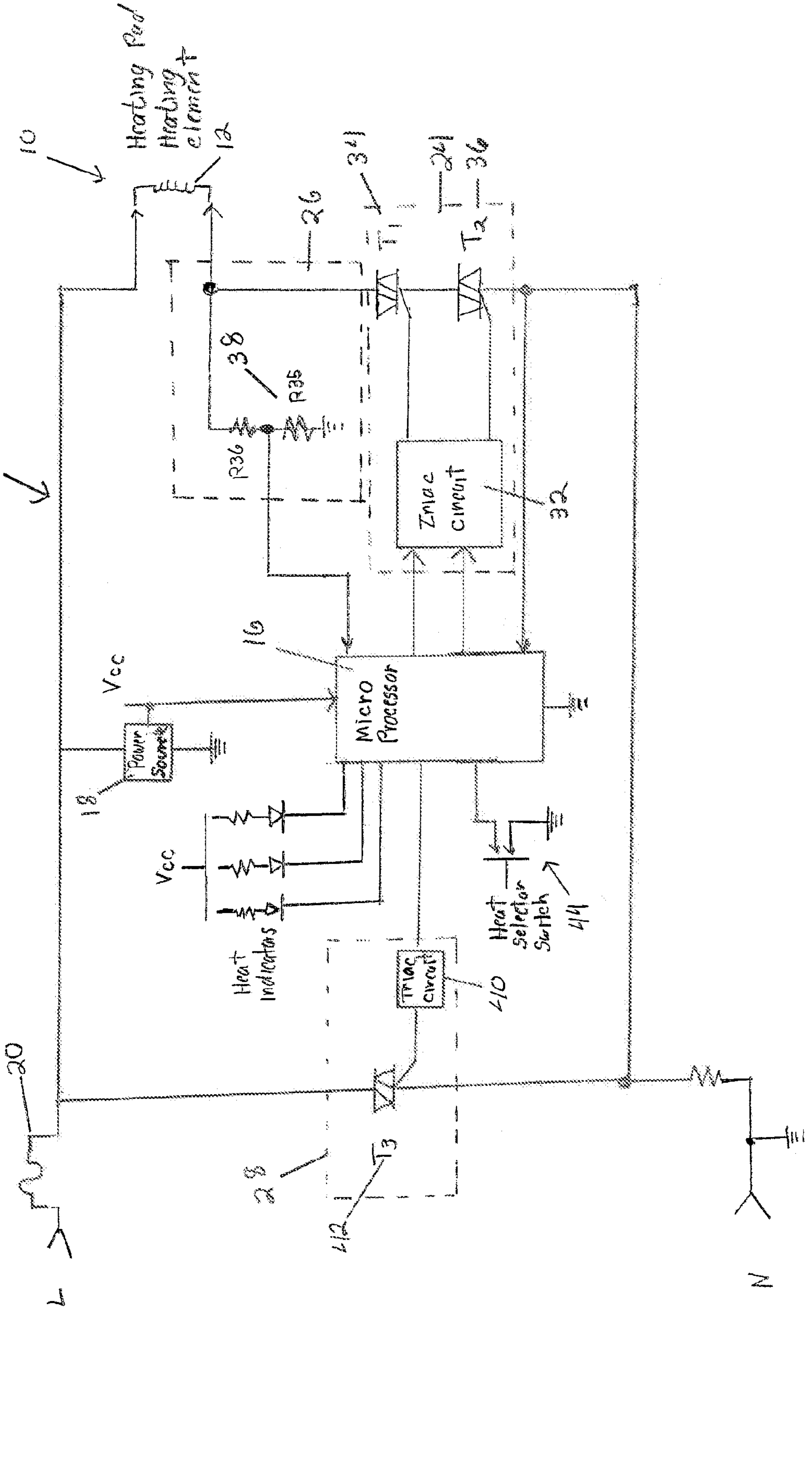
FIG. 2 depicts a schematic diagram of a safety circuit of the present disclosure.

Referring to FIG. 2, an exemplary controller 30 is provided. The controller 30 includes microprocessor 16 electrically connectable to power source 18 though fuse 20. Output of microprocessor 16 is operatively connected to heating element 12 of heating pad 10 by an electronic switch circuit 24. The electronic switch circuit 24 includes a triac circuit 32, and at least a first triac $T_1$ 34 and second triac $T_2$ 36.

A test circuit 26 is connected between the switch circuit 24 and the microprocessor 16 for testing the integrity of the switch circuit 24. The test circuit 26 includes resistor R35 38 for measuring the voltage to the heating element 12.

A disabling circuit 28 is operatively connected to the microprocessor 16, and includes the fuse 20, a triac circuit 40, and third triac $T_3$ 42. It is contemplated that, when activated, the third triac $T_3$ 42 in the disabling circuit 28 is closed, provide a path for current to the fuse 20 to blow the fuse 20, disabling the controller 30 and cutting power to the heating element 12 of the heating pad 10.

In operation, the controller 30 is electrically connected to power source 18 through the fuse 20, to provide power to heating pad 10. The power source 18 can have a predetermined voltage and frequency, e.g. 120 VAC at 60 Hz, via a standard electrical plug. The controller 30 can include a mode selector 44 for selecting one of a plurality of heat settings for the heating pad 10. By way of example, these heat settings may include "ON/OFF," "WARM," "LOW," "MED" and "HIGH."

Once heating pad 10 is actuated and a user-desired heat setting is selected, microprocessor 16 actuates switch circuit 24, closing first triac $T_1$ 34 and second triac $T_2$ 36, such that current flows to heating element 12 so as to cause it to radiate heat.

Periodically, the microprocessor 16 activates the test circuit 26, while simultaneously deactivating the switch circuit 24, opening the first triac $T_1$ 34 and second triac $T_2$ 36. If at least one of the first triac $T_1$ 34 and second triac $T_2$ 36 is operating correctly, namely, opens in response to the signal, the voltage on resistor R35 38 will be represented to the microprocessor 16 as a digital HIGH. As a result the microprocessor 16 reactivates the switch circuit 24, closes the first triac $T_1$ 34 and second triac $T_2$ 36, such that current flows to heating element 12 so as to cause it to radiate heat.

If both the first triac $T_1$ 34 and second triac $T_2$ 36 are not operating correctly, namely, fail to open in response to the signal, the voltage on resistor R35 38 will be represented to the microprocessor 16 as a digital LOW. In response, the microprocessor 16 provides a signal to activate the disabling circuit 28.

The signal to the disabling circuit 28 closes third triac $T_3$ 42, creating a path for current to blow the fuse 20, removing the current to the heating element 12. In this manner, the controller 14 is disabled, preventing the operation of the heating pad 10.

Figure 3:
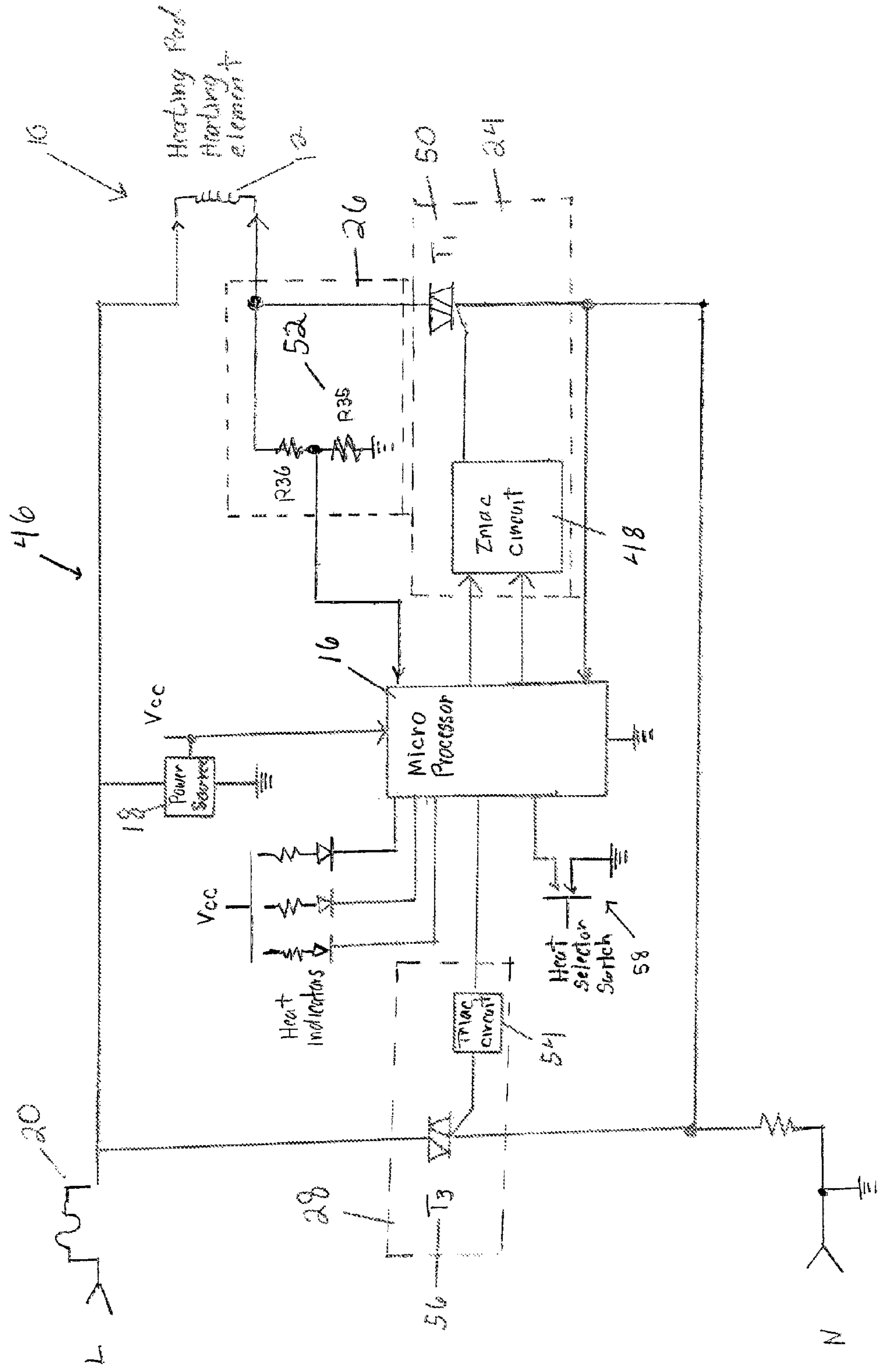
FIG. 3 depicts an alternative schematic diagram of a safety circuit of the present disclosure.

Referring to FIG. 3, an alternative controller 46 is provided. The controller 46 includes microprocessor 16 electrically connectable to power source 18 though fuse 20. Output of microprocessor 16 is operatively connected to heating element 12 of heating pad 10 by an electronic switch circuit 24. The electronic switch circuit 24 includes a triac circuit 48 and first triac $T_1$ 50.

A test circuit 26 is connected between the switch circuit 24 and the microprocessor 16 for testing the integrity of the switch circuit 24. The test circuit 26 includes resistor R35 52 for measuring the voltage to the heating element 12.

A disabling circuit 28 is operatively connected to the microprocessor 16, and includes the fuse 20, triac circuit 54, and second triac $T_2$ 56. It is contemplated that, when activated, the second triac $T_2$ 56 in the disabling circuit 28 is closed to provide a path for current to the fuse 20 to blow the fuse 20, disabling the controller 46 and cutting power to the heating element 12 of the heating pad 10.

In operation, the controller 46 is electrically connected to power source 18 through fuse 20, to provide power to heating pad 10. The power source 18 can have a predetermined voltage and frequency, e.g. 120 VAC at 60 Hz, via a standard electrical plug. The controller 46 can include a mode selector 58 for selecting one of a plurality of heat settings for the heating pad 10. By way of example, these heat settings may include "ON/OFF," "WARM," "LOW," "MED" and "HIGH."

Once heating pad 10 is actuated and a user-desired heat setting is selected, microprocessor 16 actuates switch circuit 24, closing first triac $T_1$ 50, such that current flows to heating element 12 so as to cause it to radiate heat.

Periodical the microprocessor 16 activates the test circuit 26, while simultaneously deactivating the switch circuit 24, opening the first triac $T_1$ 50. If the first triac $T_1$ 50 is operating correctly, namely, opens in response to the signal, the voltage on resistor R35 52 will be represented to the microprocessor 16 as a digital HIGH. As a result the microprocessor 16 reactivates the switch circuit 24, closes the first triac $T_1$ 50, such that current flows to heating element 12 so as to cause it to radiate heat.

If the first triac $T_1$ 50 is not operating correctly, namely, fails to open in response to the signal, the voltage on resistor R35 52 will be represented to the microprocessor 16 as a digital LOW. In response, the microprocessor 16 provides a signal to activate the disabling circuit 28.

The signal to the disabling circuit 28 closes second triac $T_2$ 56, creating a current path to blow the fuse 20, removing the current to the heating element 12. In this manner, the controller 14 is disabled, preventing the operation of the heating, pad 10.

It the above controllers 30 and 46, the switch circuit 24 is disclosed as having 1 or 2 triacs. However, the above embodiments are exemplary and it is contemplated that the switch can include multiple triacs, 2, 3, 4, . . . .

In the above controllers 30 and 46, the switch circuit 24 is disclosed as including triac(s). However these are only exemplary, and it is contemplated that other electronic switches may be utilized, include SCRs, transistors, relays, and the like.

In the above controllers 30 and 46, the electronic switch in the disabling circuit 28 is disclosed as including a triac(s). However this are only exemplary, and it is contemplated that other electronic switches may be utilized, include SCRs, transistors, relays, and the like.

In the above description, the controller 14, 30, and 40 is described as being used with textile heating devices. However, it is contemplated that the controller 14, 30, and 40 can be used with any electrical appliance for which a control provides/regulates the power provided to the appliance.

All references cited herein are expressly incorporated by reference in their entirety.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A controller for use with an electric appliance comprising:

a microprocessor;

a switch circuit connected to the microprocessor, a test circuit operatively connected to the microprocessor and the switch circuit, wherein the microprocessor periodically, and substantially simultaneously, deactivates the switch circuit and activates the test circuit, the test circuit including a sampling circuit connected between the microprocessor and the electrical appliance, wherein the sampling circuit measures the voltage to the electric appliance when the switch circuit is deactivated; and a disabling circuit, a portion of which is interposed between a power source and the microprocessor.

2. The controller for use with an electric appliance as set forth in claim 1, wherein the disabling circuit includes a disabling switch connected to a fuse, the fuse being positioned between the power source and the microprocessor.

3. The controller for use with an electric appliance as set forth in claim 2, wherein the disabling switch is opened and closed in response to a signal from the microprocessor.

4. The controller for use with an electric appliance as set forth in claim 3, wherein the disabling switch is selected from a group consisting of a triac, a SCR, a transistor, or a relay.

5. The controller for use with an electric appliance as set forth in claim 1, wherein the switch circuit includes at least one electronic switch to provide current to the electric appliance.

6. The controller for use with an electric appliance as set forth in claim 5, wherein the at least one electronic switch is opened and closed in response to a signal from the microprocessor.

7. The controller for use with an electric appliance as set forth in claim 6, wherein the at least one electronic switch is selected from a group consisting of triacs, SCRs, transistors, or relays.

8. The controller for use with an electric appliance as set forth in claim 6, wherein the test circuit verifies the integrity of the at least one electronic switch.

9. A textile heating device comprising:

a heating element;

a controller operatively connected to the heating element, and including:

a microprocessor;

a switch circuit connected to the microprocessor;

a test circuit operatively connected to the microprocessor and the switch circuit, wherein the microprocessor periodically, and substantially simultaneously, deactivates the switch circuit and activates the test circuit, the test circuit including a sampling circuit connected between the microprocessor and the heating element, wherein the sampling circuit measures the voltage to the heating element when the switch circuit is deactivated; and a disabling circuit a portion of which is interposed between a power source and the microprocessor.

10. The textile heating device as set forth in claim 9, wherein the disabling circuit includes a disabling switch connected to a fuse, the fuse being positioned between the power source and the microprocessor.

11. The textile heating device as set forth in claim 10, wherein the disabling switch is opened and closed in response to a signal from the microprocessor.

12. The textile heating device as set forth in claim 11, wherein the disabling switch is selected from a group consisting of a triac, a SCR, a transistor, or a relay.

13. The textile heating device as set forth in claim 9, wherein the switch circuit includes at least one electronic switch to provide current to the heating element.

14. The textile heating device as set forth in claim 13, wherein the at least one electronic switch is opened and closed in response to a signal from the microprocessor.

15. The textile heating device as set forth in claim 14, wherein the at least one electronic switch is selected from a group consisting of triacs, SCRs, transistors, or relays.

16. The textile heating device as set forth in claim 13, wherein the test circuit verifies the integrity of the at least one electronic switch.

17. A heating pad comprising:

a heating element; and a controller operatively connected to the heating element, and including:

a microprocessor;

a switch circuit positioned between the microprocessor and the heating element, and including at least one electronic switch, wherein the at least one electronic switch opens and closes in response to a signal from the microprocessor to provide current to the heating element;

a test circuit operatively connected to the microprocessor and the switch circuit, wherein the test circuit verifies the integrity of the at least one electronic switch, and wherein the microprocessor periodically, and substantially simultaneously, deactivates the switch circuit and activates the test circuit, the test circuit including a sampling circuit connected between the microprocessor and the heating element, wherein the sampling circuit measures the voltage to the heating element when the switch circuit is deactivated; and a disabling circuit including a disabling switch and a fuse, the fuse being positioned between the power source and the microprocessor.

18. The heating pad as set forth in claim 17, wherein the at least one electronic switch is selected from a group consisting of a triac, a SCR, a transistor, or a relay.

19. The heating pad as set forth in claim 17, wherein the disabling switch is selected from a group consisting of a triac, a SCR, a transistor, or a relay.

* * * * *